(12) United States Patent
Liao et al.

(10) Patent No.: US 12,341,158 B2
(45) Date of Patent: Jun. 24, 2025

(54) ELECTROLYTE, PREPARATION METHOD THEREOF AND LITHIUM ION BATTERY

(71) Applicant: Zhuhai CosMX Battery Co., Ltd., Zhuhai (CN)

(72) Inventors: Bo Liao, Zhuhai (CN); Suli Li, Zhuhai (CN); Junyi Li, Zhuhai (CN); Yanming Xu, Zhuhai (CN)

(73) Assignee: Zhuhai CosMX Battery Co., Ltd. (CN)

( * ) Notice: Subject to any disclaimer, the term of this patent is extended or adjusted under 35 U.S.C. 154(b) by 639 days.

(21) Appl. No.: 17/676,363

(22) Filed: Feb. 21, 2022

(65) Prior Publication Data

US 2022/0173438 A1    Jun. 2, 2022

Related U.S. Application Data

(63) Continuation of application No. PCT/CN2020/107414, filed on Aug. 6, 2020.

(30) Foreign Application Priority Data

Aug. 22, 2019 (CN) .......................... 201910780526.9

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC ......... H01M 10/0567; H01M 10/0525; H01M 2300/0025
See application file for complete search history.

(56) References Cited

U.S. PATENT DOCUMENTS

2019/0245244 A1*   8/2019   Lim ................... H01M 10/0569

FOREIGN PATENT DOCUMENTS

| CN | 101114716 A | 1/2008 |
| CN | 109891354 A | 6/2019 |

(Continued)

OTHER PUBLICATIONS

International Search Report in PCT/CN2020/107414 dated Oct. 28, 2020.

(Continued)

*Primary Examiner* — Brian R Ohara
*Assistant Examiner* — Patrick Marshall Greene
(74) *Attorney, Agent, or Firm* — Dilworth IP, LLC

(57) ABSTRACT

An electrolyte, a preparation method thereof and a lithium ion battery, where the electrolyte comprises a solvent, a lithium salt, and a first additive shown in Formula 1; in Formula 1, $R_1$ and $R_3$ are each independently selected from a substituted or unsubstituted $C_1$-$C_{20}$ alkyl group, $(—C_2H_4—O—C_2H_4—)_n$ or is a direct bond, and $1 \le n \le 5$; $R_2$ is selected from one of —NH—, —CH$_2$—, —SiH$_2$—, —BH— and —PH—. The electrolyte has simple composition, and can not only enable the lithium ion battery to maintain excellent cycle performance at high voltages, but also effectively inhibit the lithium ion battery from overproducing gas so as to optimize storage performance.

20 Claims, 1 Drawing Sheet

(56) References Cited

FOREIGN PATENT DOCUMENTS

| | | |
|---|---|---|
| CN | 109891654 A | 6/2019 |
| JP | 2000215911 A | 8/2000 |
| WO | 2019017567 A1 | 1/2019 |

OTHER PUBLICATIONS

First Office Action in CN Patent Application No. 201910780526.9 dated Aug. 3, 2021.

* cited by examiner

ELECTROLYTE, PREPARATION METHOD THEREOF AND LITHIUM ION BATTERY

CROSS-REFERENCE TO RELATED APPLICATION

The present application is a continuation of International Application No. PCT/CN2020/107414, which claims the priority to the Chinese Patent Application No. 201910780526.9 filed with the China National Intellectual Property Administration on Aug. 22, 2019, entitled "Electrolyte, Preparation Method Thereof and Lithium Ion Battery", the entire contents of the above applications are hereby incorporated by reference.

TECHNICAL FIELD

The present application relates to an electrolyte, a preparation method thereof and a lithium ion battery, belonging to the technical field of lithium ion batteries.

BACKGROUND

In recent years, the lithium-ion batteries as a secondary battery have been widely used in mobile phones, laptops, and electric vehicles. However, with the rapid development of the lithium-ion batteries, the method to extend the life of the lithium-ion batteries and to improve the energy density of the lithium-ion batteries is the greatest challenge in the current technical field of the lithium-ion batteries.

At present, in order to extend the life of the lithium ion batteries, and improve the energy density of the lithium ion batteries, increasing the charging voltage of the lithium-ion batteries is also one of the main ways of improving the energy density of the lithium ion batteries and extend the life of the lithium ion batteries, in addition to continuous optimization of the space utilization of the lithium ion batteries to improve the compaction density and gram capacity of positive and negative electrode materials of batteries, and using high-conductive carbon nano and polymer adhesive agents to increase the amount of the positive and negative electrode active materials.

Although increasing the charging voltage of the lithium-ion batteries gives a big contribution to extending the life of the lithium ion batteries and improve the energy density of the lithium ion batteries, there are also many problems. For example, when the charging voltage of the positive electrode material increases, the oxidative and decomposition of the electrolyte is exacerbated, resulting in deterioration of cycle performance of the batteries. In addition, the positive electrode material is generally dissolved and deposited to the negative electrode at high voltages, particularly after a long period of high-temperature storage, resulting in poor cycle performance of the batteries and producing gas easily.

Therefore, it is an urgent technical problem in the field to enable the lithium ion batteries to have excellent cycle performance at high voltages, and inhibit gas production and other comprehensive properties.

SUMMARY

The present application provides an electrolyte, which has simple composition, and not only enables the lithium ion battery to maintain excellent cycle performance at high voltages, but also effectively inhibit the lithium ion battery from overproducing gas and to optimize storage performance, thereby overcoming the negative effect on the lithium ion battery when increasing the charging voltage to improve life and energy density of the lithium-ion battery.

The present application further provides a preparation method of the electrolyte, which is simple and easy to implement, contributing to safe and high-efficient preparation of an electrolyte capable of improving the cycle performance and storage performance of a lithium-ion battery.

The present application further provides use of an electrolyte in a high-voltage lithium ion battery such that the high-voltage lithium ion battery has improved battery life and energy density and meanwhile has excellent cycle performance and storage performance.

The present application further provides a lithium ion battery containing the above electrolyte, and thus the lithium ion battery has excellent cycle performance and storage performance.

The present application provides an electrolyte including a solvent, a lithium salt, and a first additive as shown in Formula 1;

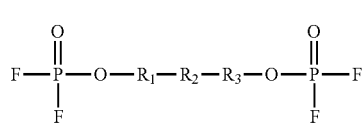

Formula 1 in which, $R_1$ and $R_3$ are each independently selected from a substituted or unsubstituted $C_1$-$C_{20}$ alkyl group, $(-C_2H_4-O-C_2H_4-)_n$, or are a direct bond, where $1 \leq n \leq 5$; $R_2$ is selected from one of $-NH-$, $-CH_2-$, $-SiH_2-$, $-BH-$ and $-PH-$.

In the electrolyte as described above, the first additive is selected from at least one of compounds as shown in Formula 1-1 and Formula 1-2:

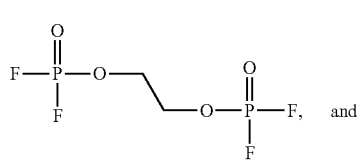

Formula 1-1

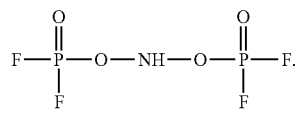

Formula 1-2

In the electrolyte as described above, the first additive is 0.1-10% by mass of the electrolyte.

In the electrolyte as described above, the first additive is 0.2-2% by mass of the electrolyte.

In the electrolyte as described above, the electrolyte further includes a second additive, which is selected from at least one of heptanedinitrile, octanedinitrile, decanedinitrile, octadecanedinitrile, glycerol trinitrile, ethylene glycol bis(propionitrile) ether, fumaric acid dinitrile, thiophene, tris(trimethylsilyl) phosphite, and hexanetrinitrile.

In the electrolyte as described above, the second additive is 0.1-10% by mass of the electrolyte.

In the electrolyte as described above, the second additive is 1-6% by mass of the electrolyte.

The present application further provides a preparation method of any one electrolyte described above, including: mixing a lithium salt, a first additive and a solvent to obtain the electrolyte.

The present application further provides use of any one electrolyte described above in a high-voltage lithium ion battery.

The present application further provides a lithium ion battery, where an electrolyte of the lithium ion battery is any one electrolyte described above.

The implementation of the present application has at least the following advantages:

1. The electrolyte provided by the present application, by adding a particular additive, is capable of optimizing the intercalation/deintercalation of lithium ions on the surface of the electrode, increasing the stability of the electrolyte, and significantly improving the cycle performance and storage performance of the lithium ion battery;
2. the preparation method of the electrolyte provided by the present application is simple in process, strong in operability, which facilitates practical promotion and large-scale application; and
3. Since the lithium ion battery provided by the present application includes the electrolyte described above in the present application, the lithium ion battery has excellent cycle performance and storage performance.

DETAILED DESCRIPTION OF EMBODIMENTS

Figure 1:
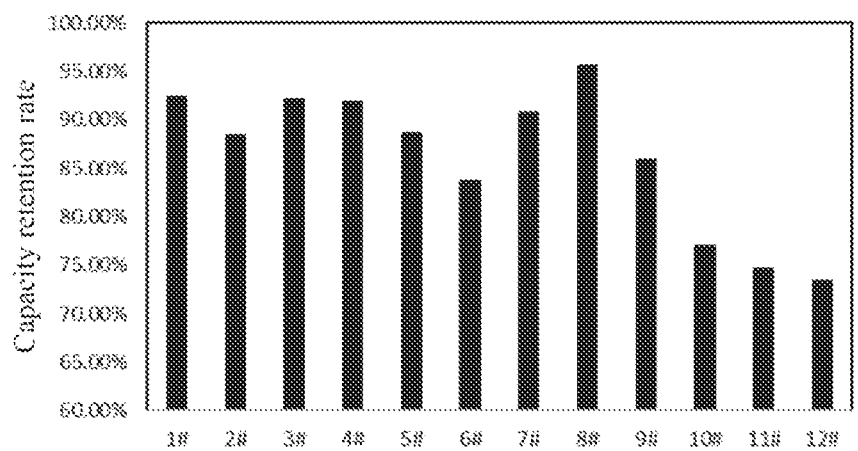
FIG. 1 is a comparative graph of capacity retention rate of lithium ion batteries 1-12 # of the present application after 400 high-temperature cycles.

In order to make the object, technical solutions, and advantages of examples of the present application more clear, the technical solutions in the examples of the present application will be described clearly and completely, and it is apparent that the described examples are part of examples of the present application but not all examples. Based on the examples in the present application, all other examples obtained by those skilled in the art without creative labor are all in the scope protected by the present application.

The present application provides an electrolyte including a solvent, a lithium salt, and a first additive as shown in Formula 1;

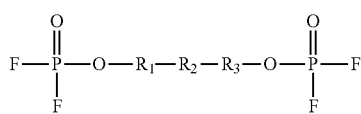

Formula 1 in which, $R_1$ and $R_3$ are each independently selected from a substituted or unsubstituted $C_1$-$C_{20}$ alkyl group, $(-C_2H_4-O-C_2H_4-)_n$ or is a direct bond, where $1 \leq n \leq 5$; and $R_2$ is selected from one of $-NH-$ $-CH_2-$, $-SiH_2-$, $-BH-$ and $-PH-$.

Among them, the $C_1$-$C_{20}$ alkyl group described above includes a $C_1$-$C_{20}$ straight-chain alkyl group, a $C_3$-$C_{20}$ branched-chain alkyl group, a $C_3$-$C_{20}$ cycloalkyl group, a $C_2$-$C_{20}$ straight-chain alkenyl group, and a $C_3$-$C_{20}$ branched-chain alkenyl group, and substituents of $R_1$ and $R_3$ may be fluorine, phenyl, and nitrile group;

$(-C_2H_4-O-C_2H_4-)_n$ where $1 \leq n \leq 5$, means that $R_1$ and $R_3$ may independently be n-$C_2H_4-O-C_2H_4-$ groups sequentially bonded;

the direct bond refers to $R_1$ and/or $R_3$ may be not any group so that oxygen atom adjacent to $R_1$ and/or $R_3$ is directly bonded to $R_2$.

The compounds as shown in above Formula 1 are commercially available.

According to the technical solution of the present application, by adding the above additive in the solvent containing lithium salt, it is capable of significantly optimizing the cycle performance and storage performance of lithium ion batteries, and avoiding the negative effect on the performance of lithium ion batteries due to the increase of voltage. The inventor analyzes the principle of performance optimization based on this phenomenon, and deems that it may be that: the additive shown in Formula 1 is capable of being reduced on the surface of the negative electrode in preference to the lithium ions in the electrolyte, so that after the lithium ions are intercalated into the negative electrode, they are capable of forming a $PO_xF_y$-group-rich compound containing lithium on the surface of the negative electrode; meanwhile, an interfacial film having similar composition may also be formed on the positive electrode when the battery is first charged, and the $PO_xF_y$-group-rich compound containing lithium can not only significantly increase lithium-ion conductive property and obviously improve the intercalation/deintercalation properties of lithium ions on the electrode surface, but also have the ability to inhibit further reduction and oxidation of the electrolyte, thereby facilitating enabling the lithium ion battery to have excellent storage performance and cycle performance at high voltages (such as above 4.4V).

In one embodiment, the compound described in the above Formula 1 may be selected from at least one of compounds as shown in Formula 1-1 and Formula 1-2:

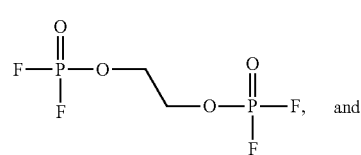

Formula 1-1

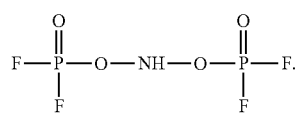

Formula 1-2

In Formula 1, $R_1$ and $R_2$ are $-CH_2-$, and $R_3$ is a direct bond; and

In Formula 2, $R_2$ is $-NH-$, and $R_1$ and $R_3$ is a direct bond.

In a specific implementation of the present application, an addition amount of the first additive in the electrolyte is reasonably controlled to facilitate further improving the performance of the lithium ion battery, so that the amount of the first additive in the electrolyte can be controlled at 0.1-10% by mass. The inventor has studied and found that as the amount of the first additive increases within a certain range, the cycle performance and storage performance of the lithium ion battery will increase firstly, then remain constant basically, and finally show a slight downward trend, so the amount of the first additive in the electrolyte is generally controlled at 0.2%-2% by mass for reasons of economy and maximization of performance optimization.

The solvent in the electrolyte of the present application may include one or more of solvents used commonly in the current lithium-ion battery electrolytes, such as, ethylene carbonate, propylene carbonate, fluoroethylene carbonate, γ-butyrolactone and γ-valerolactone, dimethyl carbonate, methyl ethyl carbonate, diethyl carbonate, ethyl acetate, methyl propyl carbonate, propyl propionate, etc. Certainly, if the solvent in the electrolyte includes two or more of the above compounds, a ratio between the compounds is not particularly limited in the present application. The mass content of the solvent in the electrolyte is not limited in the present application, and can generally be controlled at 60-88%.

The lithium salt in the electrolyte is not particularly limited in the present application, and may be lithium salts commonly used in the current lithium ion electrolytes. For example, it may be selected from one or more of lithium hexafluorophosphate, lithium bis(fluorosulfonyl)imide, lithium bis(trifluoromethanesulfonyl)imide, lithium difluorobis(oxalato)borate, lithium bis(oxalato)borate, lithium difluorobis(oxalato) phosphate and lithium tetrafluorooxalato phosphate. Certainly, if the lithium salt in the electrolyte includes two or more of the above compounds, a ratio between the compounds is not limited in the present application. The mass amount of the lithium salt in the electrolyte is not limited in the present application, and is generally controlled at 8-20%.

Furthermore, the above electrolyte may further include a second additive, and specifically, the second additive is selected from at least one of heptanedinitrile, octanedinitrile, decanedinitrile, octadecanedinitrile, glycerol trinitrile, ethylene glycol bis(propionitrile) ether, fumaric acid dinitrile, thiophene, tris(trimethylsilyl) phosphite, and hexanetrinitrile. If the second additive includes two or more of the above compounds, a ratio between the compounds is not particularly limited in the present application.

After a large number of researches by the inventor, it was shown that the above second additive has a strong electron adsorption effect with the positive electrode (composite oxide of metals of lithium with such as cobalt, manganese, nickel and combination thereof) of the lithium ion battery, and is capable of forming a protective film having an isolation function on the surface of the positive electrode when the lithium ion battery is first charged and discharged, and the protective film provides a mutually independent environment for the positive electrode and the electrolyte, thereby enabling the stability of the positive electrode and the electrolyte to be improved to a certain extent, which in turn enables the storage performance and cycle performance of the lithium ion battery to be unaffected at high voltages.

It will be appreciated that use of different lithium salts and/or solvents in electrolytes and even use of different positive electrode materials, negative electrode materials or diaphragms affect the ultimate performance of lithium ion batteries. Thus, in general, when the mass amount of the second additive in the electrolyte is controlled at 0.1%-10%, a positive effect of the second additive on the electrolyte can be ensured.

It needs to be emphasized that although the second additive has a certain positive effect on the lithium ion battery at high voltages, the inventor has found that the protective film formed by the second additive on the surface of the positive electrode increases an interface impedance of the electrode to a certain extent, thereby affecting intercalation/deintercalation of lithium ions. In order to reduce the influence on the lithium ion battery caused by too high interface impedance, the inventor of the present application further defines a ratio of the second additive and the first additive, thereby enabling the first additive to cooperate with the second additive, and further improving the cycle performance and storage performance of lithium ion batteries.

Specifically, when the amount of the first additive is 0.2-2% by mass of the electrolyte and the amount of the second additive is 1-6% by mass of the electrolyte, a ratio of contents of $PO_xF_y$ group to LiF in the electrode/electrolyte interface of the positive electrode may be optimized to be approximately 1.5-2:1 and a ratio of contents of $PO_xF_y$ group to LiF in the electrode/electrolyte interface of the negative electrode may be optimized to be approximately 5-6:1. The above ratios are optimal for balancing a low resistance required for intercalation/deintercalation of lithium ions and a high resistance required for avoiding decomposition of the electrolyte. Thus, such combination of electrolyte can counteract negative effect that may be caused by the second additive, enabling the storage performance and cycle performance of the lithium ion battery to be still excellent at high voltages.

The present application further provides a preparation method of the foregoing electrolyte, including: mixing the aforementioned lithium salt, the first additive with the solvent to obtain the electrolyte.

During the preparation, the lithium salt and the first additive can be added to the solvent, followed by stirring, to obtain the electrolyte of the present application. Where an adding order of the lithium salt and the first additive is not limited in the present application.

Furthermore, if the electrolyte further includes the second additive, an adding order of the lithium salt, the first additive, and the second additive is not limited in the present application.

The preparation method of the electrolyte of the present application is easy to operate and requires only mixing raw materials and stirring, thus enables to complete the preparation of the electrolyte at high efficiency and low cost.

The present application further provides use of any one electrolyte described above in a high-voltage lithium ion battery. The high-voltage lithium ion battery of the present application refers to a lithium-ion battery at 4.4 V or more.

The above electrolyte enables the lithium ion battery to maintain excellent cycle performance at high voltages, and can effectively inhibit excessive gas production of the lithium ion battery so as to optimize the storage performance of the lithium ion battery, and thus when the method of increasing voltage is used to improve the energy density of the lithium ion battery and extend the life of the lithium ion battery, the electrolyte of the present application may be applied as the electrolyte in a high-voltage lithium ion battery, thereby further optimizing the performance of the lithium ion battery.

The present application further provides a lithium ion battery, and the electrolyte of the lithium ion battery is any one electrolyte described above.

It may be come into mind that the lithium ion battery of the present application includes a positive electrode, a negative electrode, and a diaphragm, in addition to the above electrolyte.

In the lithium ion battery of the present application, the positive electrode specifically includes a positive electrode current collector layer and a positive electrode film disposed on a surface of the positive electrode current collector layer and formed by a positive electrode active material.

When the positive electrode is specifically prepared, at least one positive electrode active material together with a conductive agent and an adhesive agent can be dispersed into an appropriate amount of N-methylpyrrolidone (NMP) solvent, mixed under sufficient stirring to form a uniform positive electrode slurry; the positive electrode slurry is coated uniformly on the positive electrode current collector layer, dried, rolled and slit, to obtain a positive electrode.

The positive electrode active material of the present application is at least one of composite oxides of metals of lithium with cobalt, manganese, nickel and combination thereof. For example, the positive electrode active material is selected from at least one of lithium cobaltate, lithium nickelate, lithium manganate, nickel-cobalt-manganese ternary material, nickel-cobalt-aluminium ternary material, lithium iron phosphate (LFP), lithium nickel manganate, and lithium-rich manganese-based material.

The material for the positive electrode current collector layer may be at least one of aluminum foil and nickel foil.

The conductive agent can be selected from at least one of carbon black, acetylene black, graphene, Ketjen black, and carbon fiber.

The adhesive agent can be selected from at least one of polytetrafluoroethylene, polyvinylidene fluoride, polyvinyl fluoride, polyethylene, polypropylene, polyvinyl alcohol, carboxymethyl cellulose, hydroxypropyl cellulose, diacetyl cellulose, polyvinyl chloride, carboxylated polyvinyl chloride, polymers containing ethylene oxide, and polyvinylpyrrolidone, and polyurethane.

In the lithium ion battery of the present application, the negative electrode specifically includes a negative electrode current collector layer and a negative electrode film disposed on a surface of the negative electrode current collector layer and formed by a negative electrode active material.

When the negative electrode is specifically prepared, a negative electrode active material together with a conductive agent and an adhesive agent can be dispersed into an appropriate amount of deionized water, mixed under sufficient stirring to form a uniform negative electrode slurry; the negative electrode slurry is coated uniformly on the negative electrode current collector layer, dried, rolled and slit, to obtain a negative electrode.

The negative electrode active material of the present application is carbon-containing material, such as at least one of artificial graphite, hard carbon, and soft carbon, etc.

The material of the negative electrode current collector layer may be at least one of copper foil, foam nickel, and foam copper.

The conductive agent can be selected from at least one of natural graphite, artificial graphite, carbon black, acetylene black, Ketjen black, carbon fiber, and graphene.

The adhesive agent can be selected from at least one of carboxymethyl cellulose, butadiene styrene rubber, polyvinyl chloride, carboxylated polyvinyl chloride, polyvinyl fluoride, polymers containing ethylene oxide, polyvinylpyrrolidone, polyurethane, polytetrafluoroethylene, polyvinylidene fluoride, polyethylene, polypropylene, polyamide imide, polyvinyl alcohol, and sodium polyacrylate.

Selection of a material for the diaphragm is not limited in the present application, and the material may be a diaphragm material commonly used in a current lithium ion battery, such as one of polypropylene (PP) diaphragm, polyethylene (PE) diaphragm, and polyvinylidene fluoride diaphragm.

When the lithium ion battery is prepared, the positive electrode, the diaphragm, and the negative electrode are stacked in order, enabling the diaphragm to be disposed between the positive electrode and the negative electrode to play a role of isolation, and then they are wound to obtain a bare cell, the bare cell is disposed in an outer packing shell and dried, and then is filled with the electrolyte of the present application. The preparation of lithium ion battery is completed after procedures including vacuum encapsulating, setting aside, chemically forming, shaping, etc.

Due to the inclusion of the aforementioned electrolyte, the lithium ion battery of the present application has excellent storage performance and cycle performance at high voltages.

Hereinafter, the electrolyte and the preparation method thereof and the lithium ion battery of the present application will be described in detail by specific examples.

Where the compounds shown in Formulas 1-1 and 1-2 are purchased from TCI Chemical Industrial Development Co., Ltd.

EXAMPLE 1

The electrolyte of this example is prepared according to the following method:

The 15% $LiPF_6$, 1% compound shown in Formula 1-1, 3% ethylene glycol bis(propionitrile) ether, 1% hexanetrinitrile, and 80% organic solvent obtained by mixing ethylene carbonate, propyl propionate and diethyl carbonate in a volume ratio of 1:1:1 were mixed fully to obtain the electrolyte of Example 1.

The electrolyte in Example 1 was combined with lithium cobaltate as positive electrode, polyethylene as diaphragm, and graphite as negative electrode to assemble into a lithium ion battery 1 #.

The preparation method of the lithium cobaltate as positive electrode includes: mixing lithium cobaltate as the positive electrode active material, acetylene black as the conductive agent, and polytetrafluoroethylene as the adhesive agent in a mass ratio of 96:2:2, adding NMP solvent, and stirring under the action of a vacuum mixer until the system is uniform to obtain a positive electrode slurry; coating uniformly the positive electrode slurry to an aluminum foil as positive electrode current collector, drying at room temperature and then transferring to an oven to continue drying, and then slitting and cutting, to obtain the positive electrode.

The preparation method of the graphite as negative electrode includes: mixing graphite as negative electrode active material, acetylene black as conductive agent, and carboxymethyl cellulose and butadiene styrene rubber as the adhesive agent in a mass ratio of 96.4:1:1.2:1.4, adding deionized water as solvent, and stirring under the action of a vacuum mixer until the system is uniform to obtain a negative electrode slurry; uniformly coating the negative electrode slurry to a copper foil as negative electrode current collector, drying at room temperature and then transferring to an oven to continue drying, and then slitting and cutting, to obtain the negative electrode.

EXAMPLE 2

The preparation method of the electrolyte of this example is the same as in Example 1, except that the compound shown in Formula 1-1 in the electrolyte of this example accounts for 0.1% by mass of the electrolyte, and the organic solvent accounts for 80.9% by mass of the electrolyte.

The electrolyte in Example 2 was combined with lithium cobaltate as positive electrode, polyethylene as diaphragm, and graphite as negative electrode to assemble into a lithium ion battery 2 #.

EXAMPLE 3

The preparation method of the electrolyte of this example is the same as in Example 1, except that the compound shown in Formula 1-1 in the electrolyte of this example accounts for 10% by mass of the electrolyte, and the organic solvent accounts for 71% by mass of the electrolyte.

The electrolyte in Example 3 was combined with lithium cobaltate as positive electrode, polyethylene as diaphragm, and graphite as negative electrode to assemble into a lithium ion battery 3 #.

EXAMPLE 4

The preparation method of the electrolyte of this example is the same as in Example 1, except that 3% ethylene glycol bis(propionitrile) ether and 1% hexanetrinitrile in Example 1 are replaced with 1% octadecane dinitrile and 3% glycerol trinitrile.

The electrolyte in Example 4 was combined with lithium cobaltate as positive electrode, polyethylene as diaphragm, and graphite as negative electrode to assemble into a lithium ion battery 4 #.

EXAMPLE 5

The preparation method of the electrolyte of this example is the same as in Example 1, except that the compound shown in Formula 1-1 in Example 1 is replaced with the compound shown in Formula 1-2.

The electrolyte in Example 5 was combined with lithium cobaltate as positive electrode, polyethylene as diaphragm, and graphite as negative electrode to assemble into a lithium ion battery 5 #.

EXAMPLE 6

The preparation method of the electrolyte of this example is the same as in Example 1, except that the electrolyte of this example does not include ethylene glycol bis(propionitrile) ether and hexanetrinitrile, and the organic solvent accounts for 84% by mass of the electrolyte.

The electrolyte in Example 6 was combined with lithium cobaltate as positive electrode, polyethylene as diaphragm, and graphite as negative electrode to assemble into a lithium ion battery 6 #.

EXAMPLE 7

The preparation method of the electrolyte of this example is the same as in Example 1, except that the compound shown in Formula 1-1 in the electrolyte of this example accounts for 0.5% by mass of the electrolyte, and the organic solvent accounts for 80.5% by mass of the electrolyte.

The electrolyte in Example 7 was combined with lithium cobaltate as positive electrode, polyethylene as diaphragm, and graphite as negative electrode to assemble into a lithium ion battery 7 #.

EXAMPLE 8

The preparation method of the electrolyte of this example is the same as in Example 7, except that the electrolyte of this example does not include ethylene glycol bis(propionitrile) ether, and the organic solvent accounts for 83.5% by mass of the electrolyte.

The electrolyte in Example 8 was combined with lithium cobaltate as positive electrode, polyethylene as diaphragm, and graphite as negative electrode to assemble into a lithium ion battery 8 #.

EXAMPLE 9

The preparation method of the electrolyte of this example is the same as in Example 7, except that the adding amount of hexanetrinitrile in the electrolyte of this example is 4%, and the organic solvent accounts for 77.5% by mass of the electrolyte.

The electrolyte in Example 9 was combined with lithium cobaltate as positive electrode, polyethylene as diaphragm, and graphite as negative electrode to assemble into a lithium ion battery 9 #.

COMPARATIVE EXAMPLE 1

The preparation method of the electrolyte of this comparative example is the same as in Example 1, except that the compound shown in Formula 1-1 is not included in the electrolyte of this comparative example, and the solvent accounts for 81% by mass of the electrolyte.

The electrolyte in Comparative Example 1 was combined with lithium cobaltate as positive electrode, polyethylene as diaphragm, and graphite as negative electrode to assemble into a lithium ion battery 10 #.

COMPARATIVE EXAMPLE 2

The preparation method of the electrolyte of this comparative example is the same as in Example 4, except that the compound shown in Formula 1-1 is not included in the electrolyte of this comparative example, and the solvent accounts for 81% by mass of the electrolyte.

The electrolyte in Comparative Example 2 was combined with lithium cobaltate as positive electrode, polyethylene as diaphragm, and graphite as negative electrode to assemble into a lithium ion battery 11 #.

COMPARATIVE EXAMPLE 3

The preparation method of the electrolyte of this comparative example is the same as in Example 5, except that the compound shown in Formula 1-2 is not included in the electrolyte of this comparative example, and the solvent accounts for 81% by mass of the electrolyte.

The electrolyte in Comparative Example 3 was combined with lithium cobaltate as positive electrode, polyethylene as diaphragm, and graphite as negative electrode to assemble into a lithium ion battery 12 #.

Electrochemical performance of the above lithium ion batteries 1-12 # were tested, specifically described as below:

1. High-Temperature Cycle Test

The lithium-ion batteries were placed at 45° C. and are subjected to charge and discharge cycles using a current of 1C at a charge-and-discharge voltage interval of 3-4.5 V; the initial capacity was recorded as Q, and the capacity was recorded as Q2 after 400 cycles; capacity retention rate of high-temperature cycle of the batteries was calculated by the following equation.

Capacity retention rate (%)=$Q_2/Q \times 100$

2. Storage Test at Full Charge

The lithium ion batteries were charged at 25° C. to 4.5 V at a current of 0.5C, and the initial thickness was recorded as T, and subsequently, the batteries were stored at 85° C. for 4 hours, the thickness after storage was recorded as T2, and the thickness expansion rate after high-temperature storage of the batteries was calculated by the following equation.

Thickness expansion ratio (%)=$T2/T$×100

Figure 2:
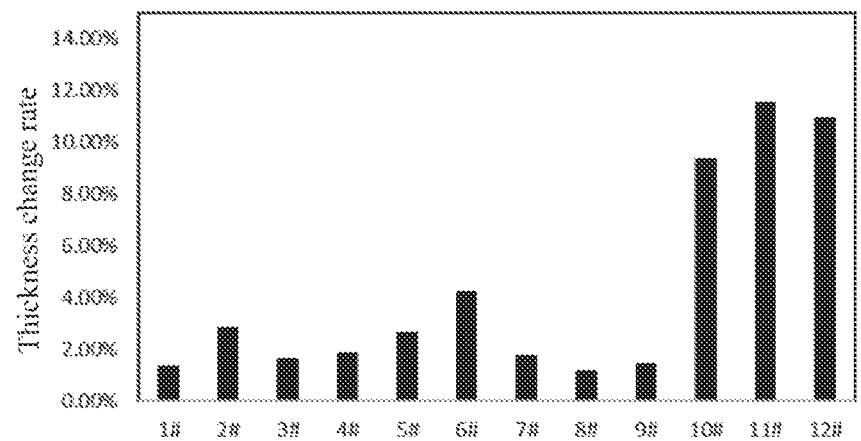
FIG. 2 is a comparative graph of thickness expansion rate of lithium ion batteries 1-12 # of the present application after high-temperature storage.

FIG. 1 is a comparative graph of the capacity retention rate of the lithium ion batteries 1-12 # of the present application after 400 high-temperature cycles; and FIG. 2 is a comparative graph of the thickness expansion rate of the lithium ion batteries 1-12 # of the present application after high-temperature storage.

It can be seen from FIGS. 1 and 2 that: the cycle performance and storage performance of the lithium ion batteries at high voltages can be significantly improved by adding a particular additive into the electrolyte of the lithium ion batteries in the examples of the present application.

Finally, it should be noted that the above examples are only intended to illustrate the technical solutions of the present application, and not limit the present application; although the present application has been described in detail with reference to the foregoing examples, it should be understood by those skilled in the art that: the technical solutions recorded in foregoing examples may still be modified, or some or all of the technical features therein may be equivalently substituted; and these modifications or substitutions do not make the essence of the corresponding technical solutions depart from the scope of technical solutions of the examples of the present application.

What is claimed is:

1. An electrolyte, comprising a solvent, a lithium salt, and a first additive as shown in Formula 1;

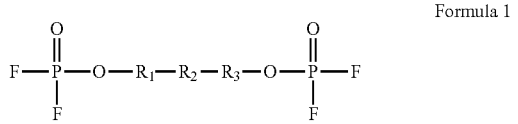

Formula 1 in formula 1, $R_1$ and $R_3$ are each independently selected from a substituted or unsubstituted $C_1$-$C_{20}$ alkyl group, (—$C_2H_4$—O—$C_2H_4$—)$_n$ or is a direct bond, where 1≤n≤5; and $R_2$ is selected from one of —NH—, —$SiH_2$—, —BH— and —PH—.

2. The electrolyte according to claim 1, wherein the first additive is selected from a compound as shown in Formula 1-2:

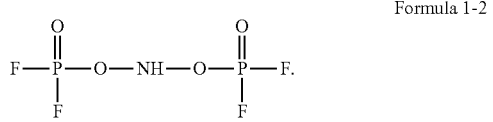 [SMILES: O=P(F)(F)ONOP(=O)(F)F]

Formula 1-2

3. The electrolyte according to claim 1, wherein the first additive is 0.1-10% by mass of the electrolyte.

4. The electrolyte according to claim 2, wherein the first additive is 0.1-10% by mass of the electrolyte.

5. The electrolyte according to claim 3, wherein the first additive is 0.2-2% by mass of the electrolyte.

6. The electrolyte according to claim 4, wherein the first additive is 0.2-2% by mass of the electrolyte.

7. The electrolyte according to claim 1, wherein the electrolyte further comprises a second additive, and the second additive is selected from at least one of heptanedinitrile, octanedinitrile, decanedinitrile, octadecane dinitrile, glycerol trinitrile, ethylene glycol bis(propionitrile) ether, fumaric acid dinitrile, thiophene, tris(trimethylsilyl) phosphite, and hexanetrinitrile.

8. The electrolyte according to claim 2, wherein the electrolyte further comprises a second additive, and the second additive is selected from at least one of heptanedinitrile, octanedinitrile, decanedinitrile, octadecane dinitrile, glycerol trinitrile, ethylene glycol bis(propionitrile) ether, fumaric acid dinitrile, thiophene, tris(trimethylsilyl) phosphite, and hexanetrinitrile.

9. The electrolyte according to claim 3, wherein the electrolyte further comprises a second additive, and the second additive is selected from at least one of heptanedinitrile, octanedinitrile, decanedinitrile, octadecane dinitrile, glycerol trinitrile, ethylene glycol bis(propionitrile) ether, fumaric acid dinitrile, thiophene, tris(trimethylsilyl) phosphite, and hexanetrinitrile.

10. The electrolyte according to claim 4, wherein the electrolyte further comprises a second additive, and the second additive is selected from at least one of heptanedinitrile, octanedinitrile, decanedinitrile, octadecane dinitrile, glycerol trinitrile, ethylene glycol bis(propionitrile) ether, fumaric acid dinitrile, thiophene, tris(trimethylsilyl) phosphite, and hexanetrinitrile.

11. The electrolyte according to claim 5, wherein the electrolyte further comprises a second additive, and the second additive is selected from at least one of heptanedinitrile, octanedinitrile, decanedinitrile, octadecane dinitrile, glycerol trinitrile, ethylene glycol bis(propionitrile) ether, fumaric acid dinitrile, thiophene, tris(trimethylsilyl) phosphite, and hexanetrinitrile.

12. The electrolyte according to claim 6, wherein the electrolyte further comprises a second additive, and the second additive is selected from at least one of heptanedinitrile, octanedinitrile, decanedinitrile, octadecane dinitrile, glycerol trinitrile, ethylene glycol bis(propionitrile) ether, fumaric acid dinitrile, thiophene, tris(trimethylsilyl) phosphite, and hexanetrinitrile.

13. The electrolyte according to claim 7, wherein the second additive is 0.1-10% by mass of the electrolyte.

14. The electrolyte according to claim 8, wherein the second additive is 0.1-10% by mass of the electrolyte.

15. The electrolyte according to claim 9, wherein the second additive is 0.1-10% by mass of the electrolyte.

16. The electrolyte according to claim 10 wherein the second additive is 0.1-10% by mass of the electrolyte.

17. The electrolyte according to claim 13, wherein the second additive is 1-6% by mass of the electrolyte.

18. A preparation method of the electrolyte according to claim 1, comprising: mixing a lithium salt, a first additive, and a solvent to obtain the electrolyte.

19. Use of the electrolyte according to claim 1 in a high-voltage lithium ion battery.

20. A lithium ion battery, wherein an electrolyte of the lithium ion battery is the electrolyte according to claim 1.

* * * * *